United States Patent [19]

Nutting et al.

[11] Patent Number: 4,746,988
[45] Date of Patent: May 24, 1988

[54] EXPOSURE CONTROL APPARATUS FOR A STILL VIDEO CAMERA HAVING AN ELECTRONIC VIEWFINDER

[75] Inventors: Thomas C. Nutting, Fairport; Richard A. Shroyer, Rochester, both of N.Y.

[73] Assignee: Eastman Kodak Company, Rochester, N.Y.

[21] Appl. No.: 880,461

[22] Filed: Jun. 30, 1986

[51] Int. Cl.⁴ .......................................... H04N 5/238
[52] U.S. Cl. .................................... 358/228; 358/909
[58] Field of Search ...................... 358/224, 909, 228

[56] References Cited

U.S. PATENT DOCUMENTS

| | | | |
|---|---|---|---|
| 3,564,330 | 2/1971 | Pfeiffer | 315/10 |
| 3,767,853 | 10/1973 | Bendell et al. | 178/7.2 |
| 4,175,842 | 11/1979 | Sakurada et al. | 354/23 D |
| 4,297,012 | 10/1981 | Nara | 354/23 D |
| 4,329,029 | 5/1982 | Haskell | 354/23 D |
| 4,329,030 | 7/1982 | Aihara et al. | 354/23 D |
| 4,345,825 | 9/1982 | Matteson et al. | 354/23 D |
| 4,359,273 | 11/1982 | Aihara et al. | 354/23 D |
| 4,363,541 | 12/1982 | Aihara et al. | 354/23 D |
| 4,366,501 | 12/1982 | Tsunekawa et al. | 358/310 |
| 4,453,811 | 6/1984 | Yamasaki | 354/412 |
| 4,455,068 | 6/1984 | Izuhara | 354/412 |
| 4,456,931 | 6/1984 | Toyoda et al. | 358/335 |
| 4,458,996 | 7/1984 | Harigaya et al. | 354/412 |
| 4,492,450 | 1/1985 | Watanabe et al. | 354/412 |
| 4,503,508 | 3/1985 | Brooks et al. | 364/525 |
| 4,541,010 | 9/1985 | Alston | 358/44 |
| 4,558,368 | 12/1985 | Aoki | 358/228 |
| 4,571,627 | 2/1986 | Stempeck | 358/224 |
| 4,597,014 | 6/1986 | Suzuki | 358/909 |
| 4,599,657 | 7/1986 | Kinoshita et al. | 358/909 |
| 4,631,593 | 12/1986 | Kinoshita et al. | 358/909 |

FOREIGN PATENT DOCUMENTS 58-156274 9/1983 Japan.
2128053 4/1984 United Kingdom.

OTHER PUBLICATIONS

Research Disclosure Items #21504 (Mar. 1982), #22822 (Apr. 1983).

Primary Examiner—Jin F. Ng
Assistant Examiner—Stephen Brinich
Attorney, Agent, or Firm—David M. Woods

[57] ABSTRACT

A still video camera includes an electronic image sensor as a signal source either for an electronic viewfinder or for a still image processed by the camera and recorded upon a magnetic disk. Since the viewfinder operates in a movie mode (with a fixed exposure time), the light intensity required for a viewfinder display ordinarily differs from that required for a still exposure. By commonly determining the correct exposure conditions for both the viewfinder display and the still exposure, time can be saved in shifting from the movie mode to the still mode. A sample of image light in the movie mode is diverted to a microprocessor-controlled exposure circuit, which integrates the light to determine the correct diaphragm aperture for both modes of operation. The movie aperture is directly input to a diaphragm driver while the still aperture is saved until a still exposure is requested.

4 Claims, 8 Drawing Sheets

EXPOSURE CONTROL APPARATUS FOR A STILL VIDEO CAMERA HAVING AN ELECTRONIC VIEWFINDER

BACKGROUND OF THE INVENTION

1. Field of the Invention

The present invention relates to the field of still video imaging, and especially to exposure control apparatus for a still video camera of the type that produces a movie image for an electronic viewfinder in addition to a still image for recording.

2. Description Relative to the Prior Art

A still video camera, by virtue of its inherent video processing capability, is well suited for combination with an electronic viewfinder (see, for example, the camera disclosed in U.S. Pat. No. 4,456,931). This combination is particularly advantageous for previewing the picture as it will actually appear subsequent to video processing. Such a camera operates in two modes: a movie mode for producing a moving video image in the viewfinder and a still mode for producing and recording a still image. The movie mode is comparable to the operation of any motion picture video camera. In such a camera, the photosensitive region of an image sensor is continuously irradiated by scene light. Since the exposure time is fixed to accord with the video image rate (e.g., 1/30th second), the amount of light striking the image sensor is controlled by regulating the optical aperture presented to the incoming light with an adjustable diaphragm.

In the still mode, it is desirable that both the exposure time and the optical aperture are controlled so as to vary, respectively, the length of exposure and the intensity of the light striking the image sensor. For example, in order to obtain a distinct still image of an object in motion, it is necessary to shorten the exposure time so as to prevent image blur. In shortening the exposure time it is ordinarily necessary to open the aperture so as to maintain the same total exposure. On the other hand, in order to obtain a distinct still image over a broad distance range, it is necessary to close down the aperture so as to extend the depth of field. Then the exposure time would have to be lengthened accordingly. The adjustments are thus interactive, that is, exposure time adjustments require corresponding aperture adjustments, and vice-versa, in order to maintain a correct exposure value.

Since a common image sensor is the signal source for both modes, one mode excludes the other, that is, the movie mode can only precede, or follow, the still mode. This fact of operation leads to the conventional sequence of exposure control. For instance, in U.S. Pat. No. 4,456,931, an exposure operation circuit is disclosed that depends upon the output of a light measuring element for calculating an appropriate aperture value for an electronic display on a monitor. In this manner, a properly exposed video movie image is previewed prior to a still exposure. When a still exposure is called for, the exposure operation circuit interrupts the movie calculations and calculates an appropriate still aperture value from the brightness of the object sensed by the light measuring element and from an exposure time that is, e.g., manually selected.

In making the transition from movie to still mode, time must be allocated to moving the diaphragm from the movie aperture value to the still aperture value. Determining the still aperture value, moreover, involves a further cycle of the exposure operation circuit before the diaphragm can begin moving, i.e., a special signal integration period for measuring scene brightness and determining the proper still aperture and/or exposure time. While the time for measuring brightness is short... an integration can take a few milliseconds... every fractional second saved is critical at this stage. Once the exposure release has been actuated, the still image actually anticipated is already in the past. Thus it is important to get the exposure under way without delay. In the aforementioned U.S. Pat. No. 4,456,931, the exposure operation circuit is busy with the operation of the viewfinder up until the still exposure is triggered. Only then does it turn to the determination of the required aperture for the still exposure. The time thereby lost may critically affect the usefulness of the camera in many picture taking occasions, such as "snapshot" or "candid" situations where picture content is rapidly changing.

SUMMARY OF THE INVENTION

The invention relies on use of an integration period during the movie mode to commonly determine the correct aperture value for both the viewfinder display and the still exposure. This, however, presumes some changes in the ordinary mode of movie operation. Each still aperture calculation is a function not only of image brightness but also of the existing aperture value. Ordinary movie mode operation, on the other hand, does not require knowledge of the exact aperture; the diaphragm is simply manipulated to maintain a constant exposure level on the imager. The problem is solved by adapting the movie exposure to the still requirements. By monitoring, and saving, the value of the existing aperture in the movie mode, the correct still aperture can be calculated in terms of a modification to the existing aperture value... though the image sensor is actually devoted to viewfinder operation. The correct still aperture is saved until such time that it is needed. Then the diaphragm can be quickly moved to the required aperture setting without waiting for additional measurements and calculations. Since the movie aperture value is continuously updated, the still aperture value is likewise updated and continuously tracks changes in the existing aperture value.

In a still video camera having exposure control apparatus that is arranged according to the invention, the correct exposure conditions for still and movie pictures are concurrently determined from the same image light. The movie mode and the still mode commonly depend on the output from an exposure control photosensor that is separate from the image sensor. Means are provided for controlling a diaphragm according to the correct exposure conditions for a moving picture while the image sensor operates as a signal source for the viewfinder. In the meantime the correct still exposure conditions are being determined. When the image sensor operates as a signal source for a still image, the correct still exposure conditions are used to control the diaphragm.

The practice of exposure control according to the invention has additional advantages. As still exposure conditions are frequently calculated and updated though the camera is largely devoted at this time to viewfinder operation, it is a simple matter to display the still conditions to the user. This is useful in evaluating the effect of the precalculated exposure time and/or aperture on the desired picture, thereby affording the user the opportunity to change conditions before the picture is taken. The viewfinder is also useful in catching automatic exposure failures, such as under exposure of significant detail due to dominant back lighting. An exposure override facility is provided for correcting these failures. The resulting correction is not only entered into the viewfinder exposure for immediately modifying the viewfinder display but also directly transferred into the calculation of the still exposure conditions.

BRIEF DESCRIPTION OF THE DRAWINGS

The invention will be described with reference to the drawings, in which.

DESCRIPTION OF THE PREFERRED EMBODIMENT

Because video cameras and video cameras employing electronic viewfinders are well known, the present description will be directed in particular to elements forming part of, or cooperating more directly with, apparatus in accordance with the present invention. Elements not specifically shown or described herein may be selected from those known in the art.

Figure 1A:
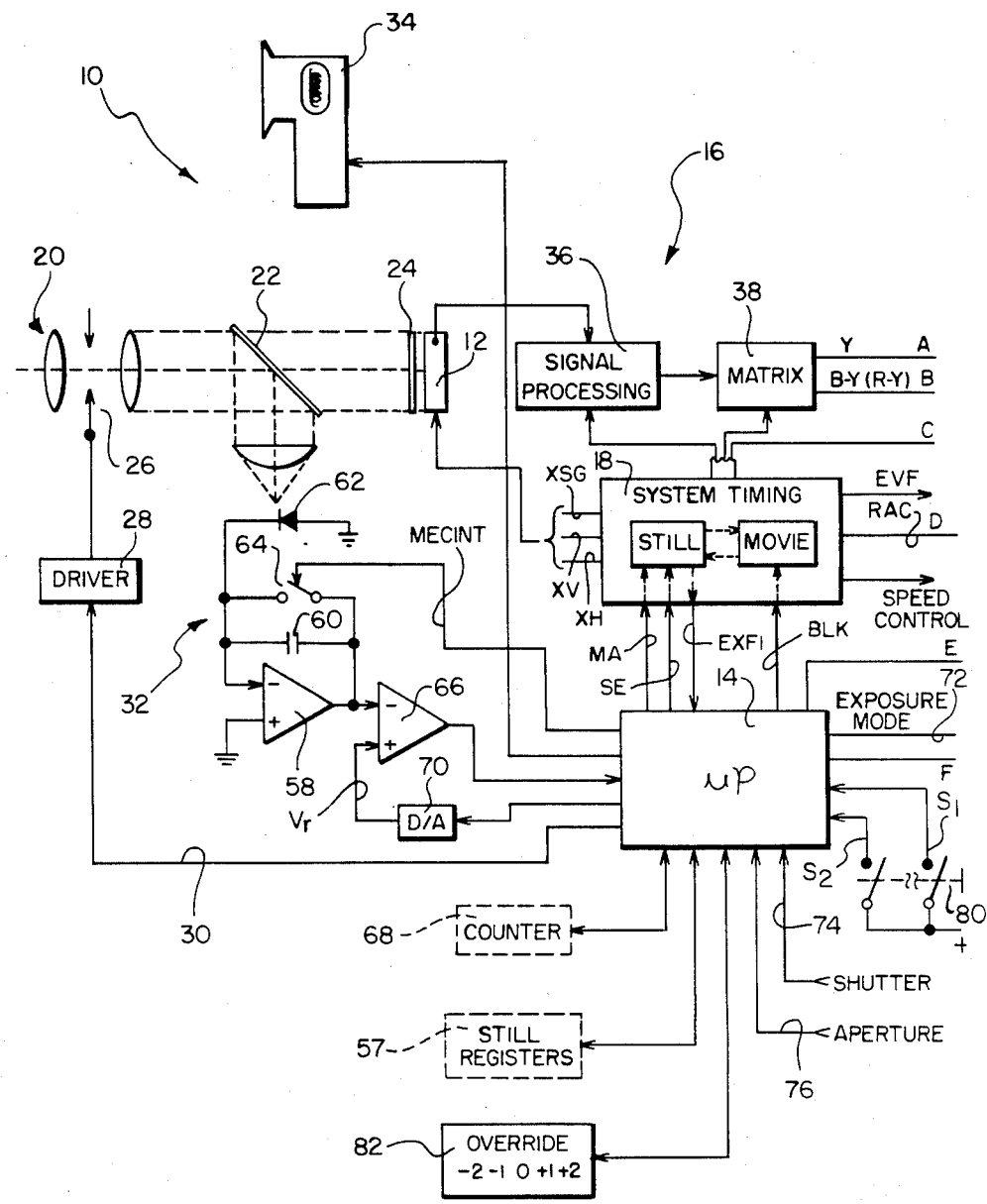
FIGS. 1 (A and B) is a block diagram of a still video camera incorporating an exposure control circuit according to the invention.
Figure 1B:
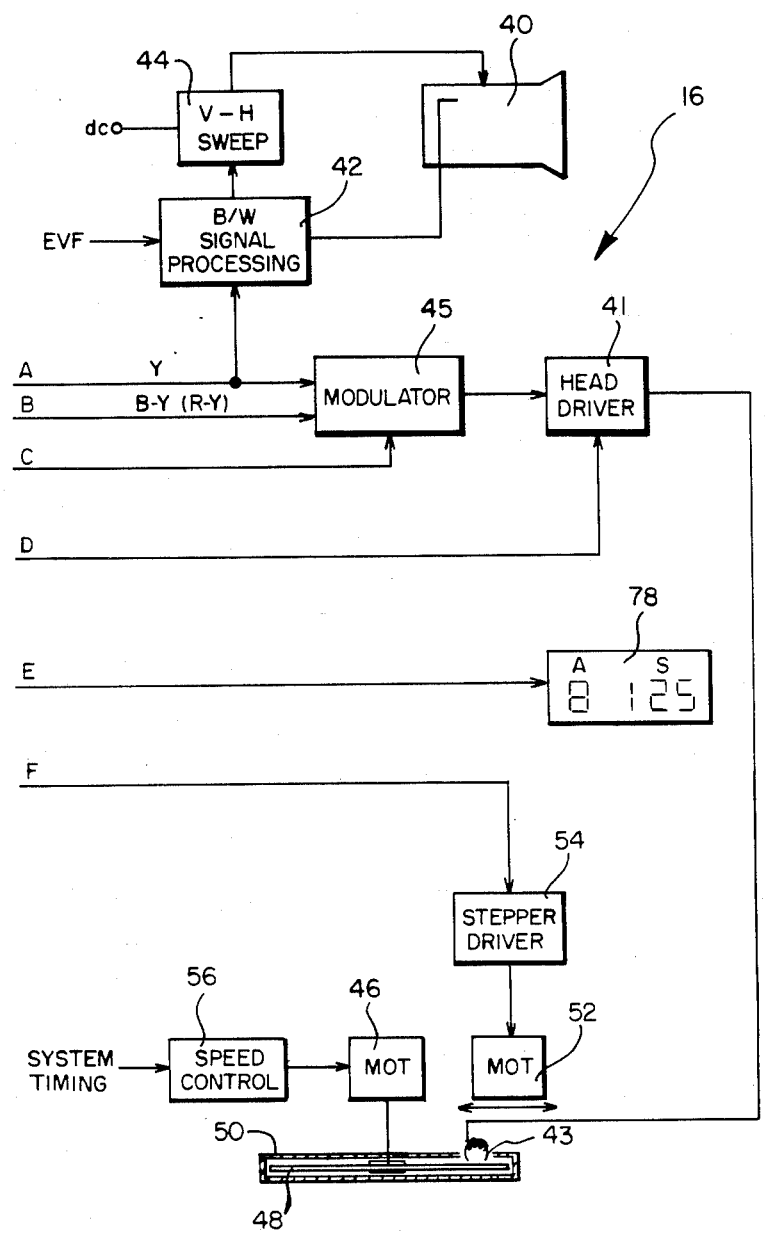
Figure 2:
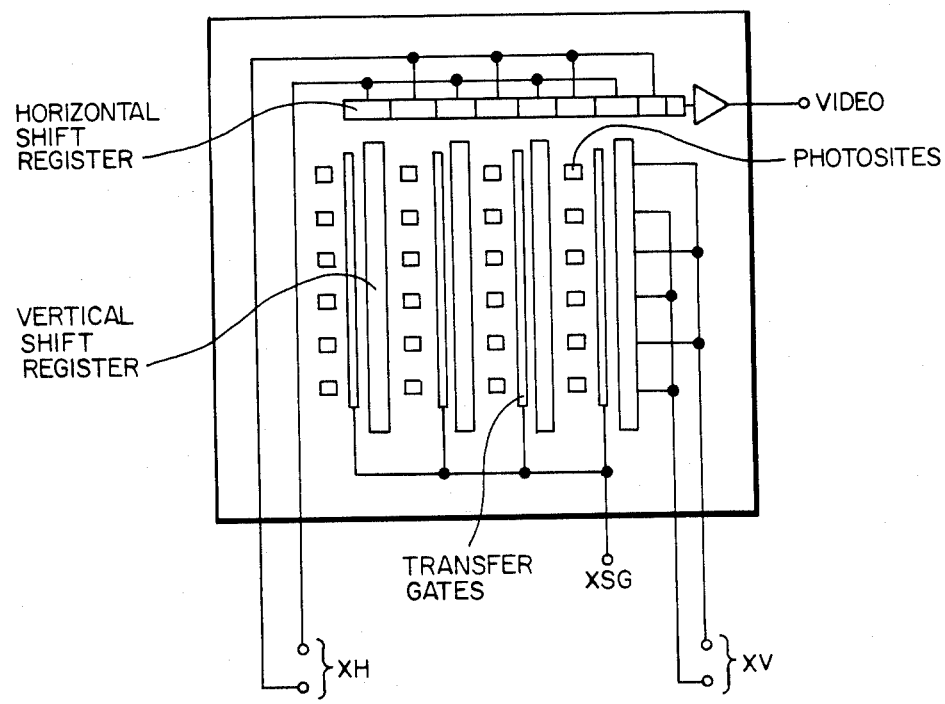
FIG. 2 is an illustration of a conventional interline-transfer imaging device used in the camera of FIG. 1.

Referring initially to FIGS. 1A and 1B, the pertinent sections of a still video camera are shown for purposes of describing the invention: An optical section 10 directs image light to an imager 12, which in its preferred form is a conventional solid-state, interline-transfer imager. The basic elements of a conventional interline-transfer imager are shown in an abbreviated form in FIG. 2. Briefly, the light gathered by the optical section 10 causes charge to collect in an array of photosites according to the pattern of the image. When a transfer gate signal XSG is low, the image charge that has collected in the photosites transfers through a set of transfer gates to a corresponding set of vertical shift registers. There a vertical phasing signal XV transfers the charge to a horizontal shift register, from which it is transferred off the imager by a horizontal phasing signal XH. Referring back to FIG. 1A, a microprocessor 14 controls the general operation of the camera, including exposure control. A signal processing, recording and display section is generally shown by the reference character 16. Finally, a timing circuit 18 synchronizes the signal processing, recording and display section 16 with the imager 12. In particular, the timing circuit 18 produces the transfer gate signal XSG, and the phasing signals XV and XH.

The optical section 10 includes a lens system 20 for directing image light from an object (not shown) to the imager 12 through a partially transmissive mirror 22 and a color filter 24. A diaphragm 26 regulates the optical aperture (through which image light passes) by a linkage with a diaphragm driver 28. The microprocessor 14 and the driver 28 communicate with one another on a line 30 when the aperture is to be, or has been, changed. When the camera is first energized, signals on the line 30 direct the driver 28 to drive the diaphragm 26 to an initial known point, such as fully open. After initialization, the microprocessor 14 continuously monitors, and saves, the aperture value of the diaphragm 26 by combining its previous known aperture setting with the newly calculated setting, as represented by the effect of the present signals being sent to the driver 28 over the line 30. The optical section 10 also interacts with an exposure control circuit 32 (also referred to as a microprocessor exposure control (MEC) circuit), which receives a sample of image light diverted by the mirror 22. The exposure control circuit 32, which employs an integration cycle in its exposure determination process, cooperates with a counting procedure in the microprocessor 14 to arrive at a brightness value of the incoming image light. An electronic flash 34 is also included for adding artificial light to the image, either as a full exposure or as a fill flash for an ambient exposure.

The video signal generated by the imager 12 (by application of the aforementioned signals XSG, XV and XH) is applied to a signal processing circuit 36, which separates the colors (red, green, and blue) and applies gain, white balance and gamma corrections to the signals. The color signals are applied to a matrix 38, which produces a luminance (Y) signal, and a line-sequential stream of color difference signals (B−Y, R−Y). The luminance signal is tapped at this point and directed through a monochrome (B/W) signal processing circuit 42 to a conventional monochrome electronic viewfinder 40. The viewfinder display, which is controlled by conventional vertical and horizontal sweep circuits 44, is activated according to the condition of a control signal EVF from the system timing circuit 18.

The luminance signal and the color difference signals are input to a modulator 45, which provides a selected preemphasis to the input signals and frequency modulates a suitable set of carriers with the preemphasized signals. When permitted by the condition of a record activate signal RAC from the system timing circuit 18, the modulated signal is amplified by a head driver circuit 41 and applied to a recording head 43. The recording portion of the section 16 includes a disk drive motor 46 for rotating a magnetic disk 48 adjacent the recording head 43. The disk 48 is mounted for rotation within a cartridge housing 50, which has an opening that allows the recording head 43 to contact the disk 48 for recording a plurality of concentric tracks (which correspond to a plurality of images). The head 43 is moved by a stepper motor 52 that is connected to a stepper driver circuit 54 controlled from the microprocessor 14. The disk drive motor 46 is operated at a constant speed by a speed control circuit 56 coupled to the timing circuit 18.

The exposure control circuit 32 includes an integrator composed of a capacitor 60 connected between the inverting input and the output of an operational amplifier 58. The output of the amplifier 58 is an integral over time of a photocurrent produced by a photodiode 62 and applied to the inverting input of the amplifier 58. The photocurrent is proportional to the brightness of the image light diverted from the main optical path by the partially transmissive mirror 22. A reset switch 64 is connected across the capacitor 60 for resetting the circuit 32 according to the condition of a signal MECINT from the microprocessor 14 (1=integrate; 0=reset).

The output voltage of the amplifier 58 increases until it equals a reference voltage $V_r$ provided to a comparator 66. This value is output as a digital number from the microprocessor 14 and converted into an analog voltage by the digital-to-analog converter 70. When equality occurs, the output of the comparator 66, which is connected to the microprocessor 14, changes state, thereby indicating the end of an integration cycle. The microprocessor 14 includes a software counter 68 (shown in broken line to indicate that it is part of the microprocessor 14), which can be zeroed at the beginning of an integration cycle and stopped when the comparator 66 changes state. The value in the counter 68 at that moment therefore represents the integration time, which corresponds to the brightness of the image light diverted upon the photodiode 62. The type of exposure control circuit employed is further described in U.S. Pat. No. 4,503,508 and Research Disclosure items 21504 (Mar. 1982; pp. 70-71) and 22822 (April, 1983; pp. 157-159).

The exposure control circuit 32 and the microprocessor 14 are mutually adapted for the two modes of operation: movie and still. In the movie mode, the exposure time is fixed and the aperture is set to a value determined by the exposure control circuit 32 and the microprocessor 14. In the still mode, on the other hand, both exposure time and aperture may be varied. One of several conventional exposure modes is selected by designating a unique input to the microprocessor 14 on a line 72 for the type of mode: for example, aperture-preferred, shutter-preferred, manual, and one or more conventional program modes for emphasizing action photos, for emphasizing depth-of-field, for compromising somewhere between the two preceding modes, and so on. (Methods for calculating the exposure time and/or the aperture value according to these modes are well known from the conventional photographic arts.) Depending on the exposure mode in use, the exposure time is manually entered to the microprocessor 14 on a shutter line 74 and the aperture value manually entered on an aperture line 76. The values for exposure time (shutter) and aperture are shown to the user on a display 78. (This display is shown as an element such as a liquid crystal display separate from the viewfinder 40 but it is to be understood that it could be, by appropriate video processing, made part of the video display in the viewfinder 40).

The exposure control circuit 32 operates in conjunction with the microprocessor 14 in either mode to maintain the same overall exposure on the imager 12. The overall exposure is a function of the exposure time and the image brightness . . . the brightness in turn depending upon the aperture value. Although the objective . . . . the same overall exposure . . . is shared by both modes, each goes about it differently. In the movie mode, since the exposure time is fixed, image brightness is calculated by observing how much time is taken (by using the value in the counter 68) for the circuit 32 to integrate to a known reference voltage $V_r$. From the calculated brightness, a new aperture is calculated which will continue to give the same overall exposure of the imager 12. In the still mode, the reference voltage $V_r$ represents the desired overall exposure of the imager, that is, the imager 12 is correctly exposed when the voltage $V_r$ is equalled and the comparator 66 changes state. This period defines the exposure time; how long it lasts depends upon the aperture selected. Since the image brightness is known from the movie mode, a set of aperture values can be arranged that will cause the integrated output of amplifier 58 to equal the reference voltage $V_r$ during a corresponding set of exposure times, thus always providing the correct overall exposure. One aperture value-exposure time combination is then selected.

As will be explained in further detail in connection with FIGS. 4 and 5, a special feature of the still video camera according to the invention permits the microprocessor 14, while in the movie mode, to calculate not only the movie exposure conditions (the required aperture value for a fixed exposure time) but also the still exposure conditions (one of a range of aperture values for one of a range of exposure times). Since, in the movie mode, the existing aperture value is known to the microprocessor 14 and the brightness of the incoming light is measured by the exposure control circuit 32, the necessary aperture change for a still exposure under the same brightness condition can also be calculated. In the still mode, the necessary aperture value for the same overall exposure will depend upon the exposure time. If the aperture value is provided by a manual setting or by an exposure mode program, the correct exposure time is determined. If the exposure time is provided either by a manual setting or by an exposure mode program, the correct aperture value is determined. The still exposure conditions are then stored in a set of still registers 57 (which are shown in broken line in FIG. 1 to indicate that they are part of the microprocessor 14). The stored still exposure conditions may then be updated for each new calculation of image brightness in the movie mode.

Another special feature is provided for overriding the exposure conditions (exposure time and aperture value) that are either set to the microprocessor 14 (on either lines 74 or 76) or calculated through the intermediation of the exposure control circuit 32. (The exposure override does not apply to the manual mode, i.e., when both lines 74 and 76 are in use). This is useful under certain lighting conditions, for example, when a dominant illuminant back lights the object to be photographed (e.g., a face) and detail in the object (e.g., facial detail) is lost. This effect can be seen on the display in the viewfinder 40. An override switch 82 is provided for adding an exposure bias to calculated (or input) exposure conditions. The switch 82 is calibrated in terms of aperture "stops", i.e., up to ±2 "stops". The switch 82 is routinely interrogated by the microprocessor 14 during the movie mode and, when a bias is detected, the diaphragm is directly changed to the new aperture via the line 30 (e.g., if the switch 82 is set to +1 "stop" and the aperture is presently at f/11, the microprocessor 14 will direct the aperture to move to f/8, and so on for other biases). The effect of the bias is immediately seen on the display in the viewfinder 40. In addition, the exposure bias is saved in the still registers 57 for correspondingly modifying the still exposure. When the bias is then used in the still exposure the reference voltage $V_r$ is correspondingly changed, since the user is in effect asking for a different overall exposure on the imager 12.

Figure 3:
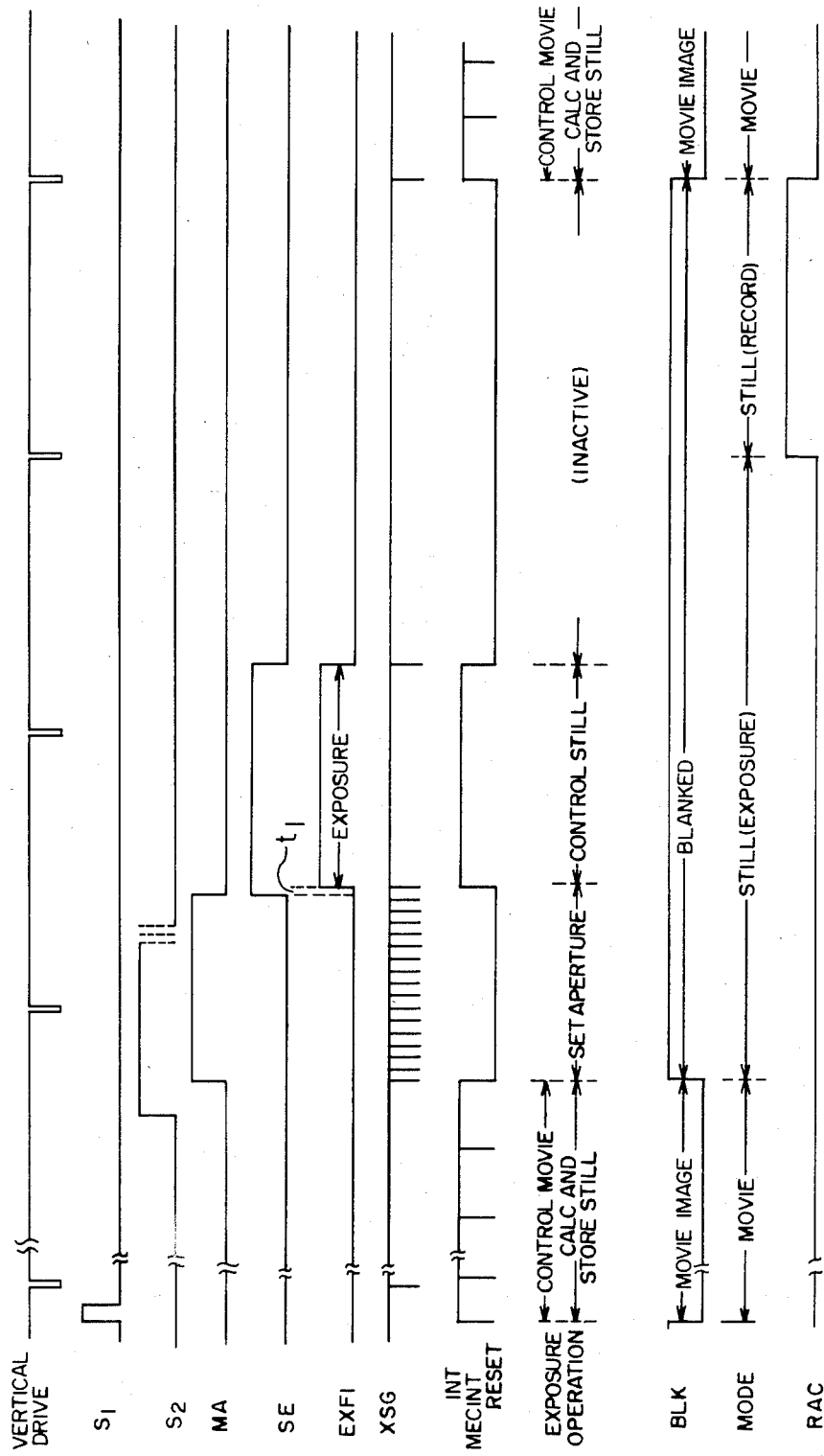
FIG. 3 is a timing diagram describing signal conditions during operation of the camera shown by FIG. 1.

Referring to FIG. 3 in connection with FIGS. 1A and 1B, the movie mode is initiated by partially depressing a two-position shutter button 80 to its first position, thereby setting a signal $S_1$ high. The low condition of a blanking signal BLK from the microprocessor 14 informs the timing circuit 18 that the camera is in the movie mode. The signal EVF is then produced to activate the viewfinder 40. In the movie mode, the timing circuit 18 produces the vertical transfer gate signal XSG for opening the transfer gates of the imager according to the vertical drive frequency. Vertical register phasing signals XV and horizontal register phasing signals XH (not shown in FIG. 3) clock the video signal off the imager within each field period. The video signal is processed into a luminance signal Y and applied to the viewfinder 40 to generate a conventional monochrome video movie display. Meanwhile, the integration period of the exposure control circuit 32 begins by activation of the signal MECINT and continues until the output of the amplifier 58 reaches the level of the reference voltage $V_r$. For this purpose the reference voltage $V_r$ is set to a known value corresponding to a proportion of a nominal voltage $V_n$ used in the still mode. For example, the voltage $V_r$ is set to a known value (in the movie mode) corresponding to a known time (for example), 5 milliseconds which, for an average exposure, permits a rapid evaluation of the brightness of the incoming image light . . . in particular, more rapid than the field rate as shown by the vertical drive frequency. Another integration period begins after this one is terminated, and another after the next is terminated, and so on, to form the integration cycle characteristic of the movie mode.

The vertical drive signal shown in FIG. 3 determines the video rate for the movie mode of operation. The still mode of operation can be seen from the subsequent waveforms as an interruption of the movie video rate; in particular the still mode can be commenced without regard to the vertical drive. The still mode is selected when the shutter button 80 is fully depressed to its second position and an exposure release signal $S_2$ is set high. At the occurrence of the next reset pulse on the signal MECINT, a moving aperture signal MA from the microprocessor 14 notifies the timing circuit 18 that a still exposure sequence is about to begin. The viewfinder 40 is also blanked at this time (BLK set high). Following the onset of the signal MA, the microprocessor 14 issues signals on a line 30 to move the diaphragm to its still aperture value, which is recovered from the still registers 57, together with an exposure bias (if any). When that is completed, a start exposure signal SE is sent to the timing circuit 18 to indicate that an exposure should commence. In the meantime the timing circuit 18 has been sending a rapid-fire sequence of XSG pulses to the transfer gates of the imager 12 to clear the photosites of unwanted charge. From there the charge is cleared by rapid operation of the vertical and horizontal registers. Following a short time interval $t_1$ in which the next clearing sequence is completed following the receipt of the signal SE, the system timing circuit 18 momentarily drops the gate signal XSG low one more time to open the imager transfer gates. As soon as the transfer gates are closed (XGS is high), the imager photosites immediately begin to collect charge from the incident image light and the still exposure period begins. Simultaneously, the timing circuit 18 notifies the microprocessor 14 with an expose field signal EXF1 that the still exposure has begun.

While the signal MA is high the signal MECINT is set low (the reset condition) so that the exposure circuit 32 does not operate during the pre-exposure clearing sequence. At the instant the expose field signal EXF1 goes high, the signal MECINT likewise goes high, thereby beginning the still exposure control integration cycle in synchronism with the still image exposure cycle. The reference voltage $V_r$ provided to the comparator 66 for the still integration cycle corresponds to the nominal voltage $V_n$, which is related to the overall exposure required of the imager 12 in the still mode. When the voltage output by the amplifier 58 equals the level of the reference voltage $V_r$ the comparator 66 changes state, thus notifying the microprocessor 14 that the exposure should end. The microprocessor 14 notifies the timing circuit 18 that the exposure should end by driving the start exposure signal SE low. The transfer gate signal XSG drops low thereby transferring the integrated image charge from the photosites to the vertical registers. Since the vertical registers in a conventional interline-transfer device are light-protected by an opaque coating, the image charge is light-protected and the still exposure is terminated. The expose field signal EXF1 then drops low, indicating to the microprocessor 14 that the exposure is over. The video blanking signal BLK remains high, thus continuing to blank the video display in the viewfinder 40.

These conditions remain static until the next occurrence of the vertical drive pulse. For this drive pulse, the transfer gate XSG is inhibited since the meaningful image charge in the vertical registers must not be contaminated by residual charge that has accumulated in the photosites since the exposure ended. Meanwhile the vertical and horizontal phasing signals XV and XH (not shown in FIG. 3) clock a video signal from the imager 12. The record activate signal RAC is set high, which activates the head driver 41, and the still video signal is recorded on the magnetic disk 48. At the occurrence of the next vertical drive interval the transfer gate signal XSG resumes its movie mode of operation and the video blanking signal BLK is set low, causing a movie image to be displayed on the viewfinder 40. The signal MECINT also resumes its movie mode of operation.

Figure 4A:
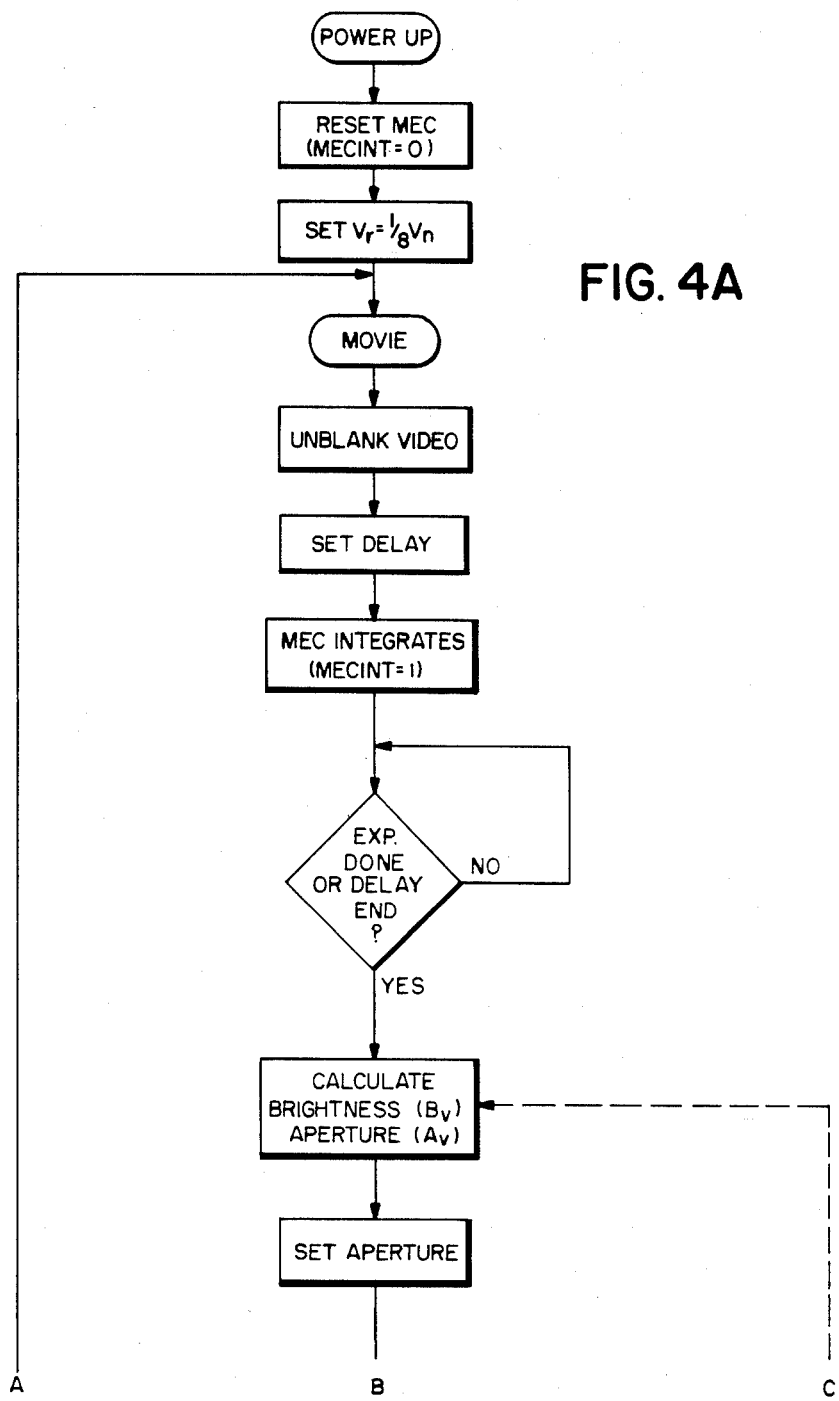
FIGS. 4 (A and B) is a flowchart of the movie mode of the camera of FIG. 1, showing also the generally concurrent calculation of still and movie exposure conditions.
Figure 4B:
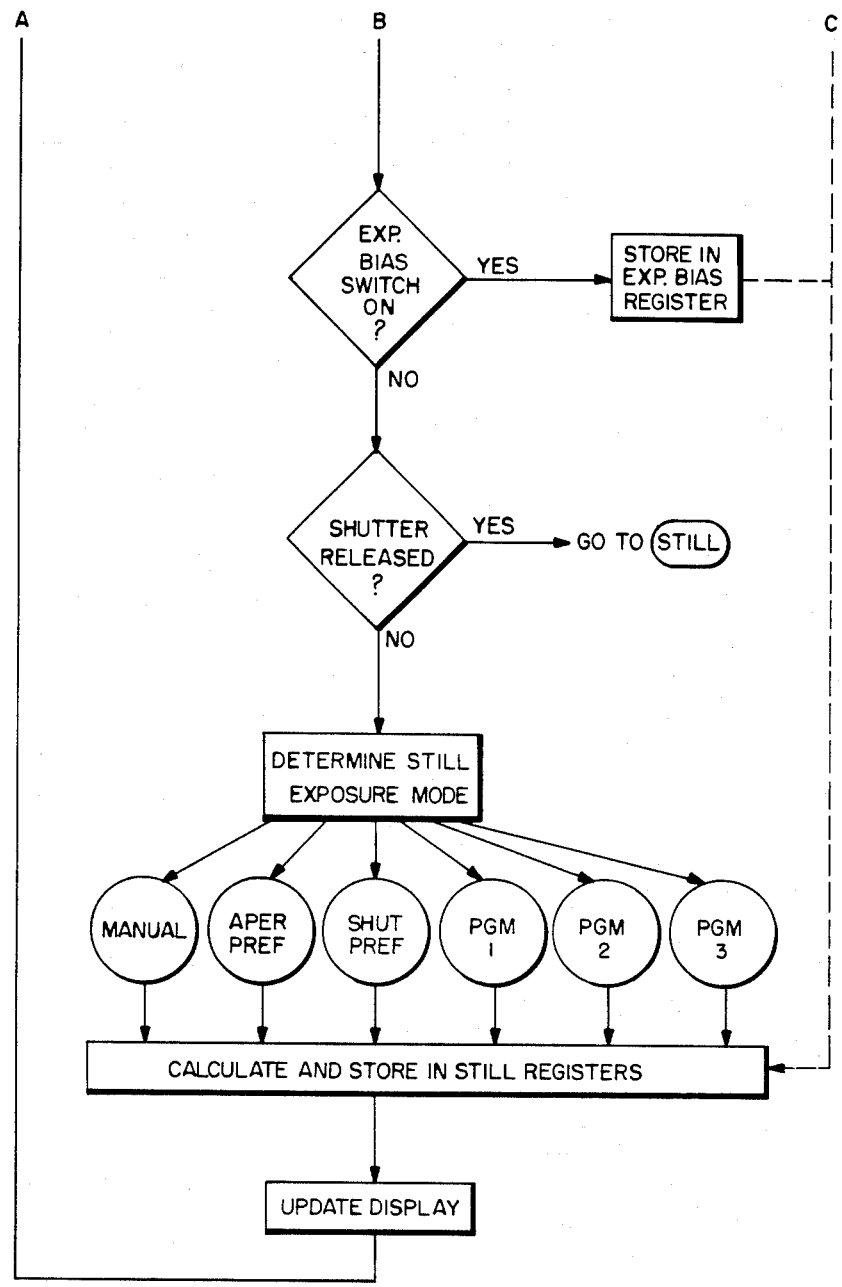
Figure 5A:
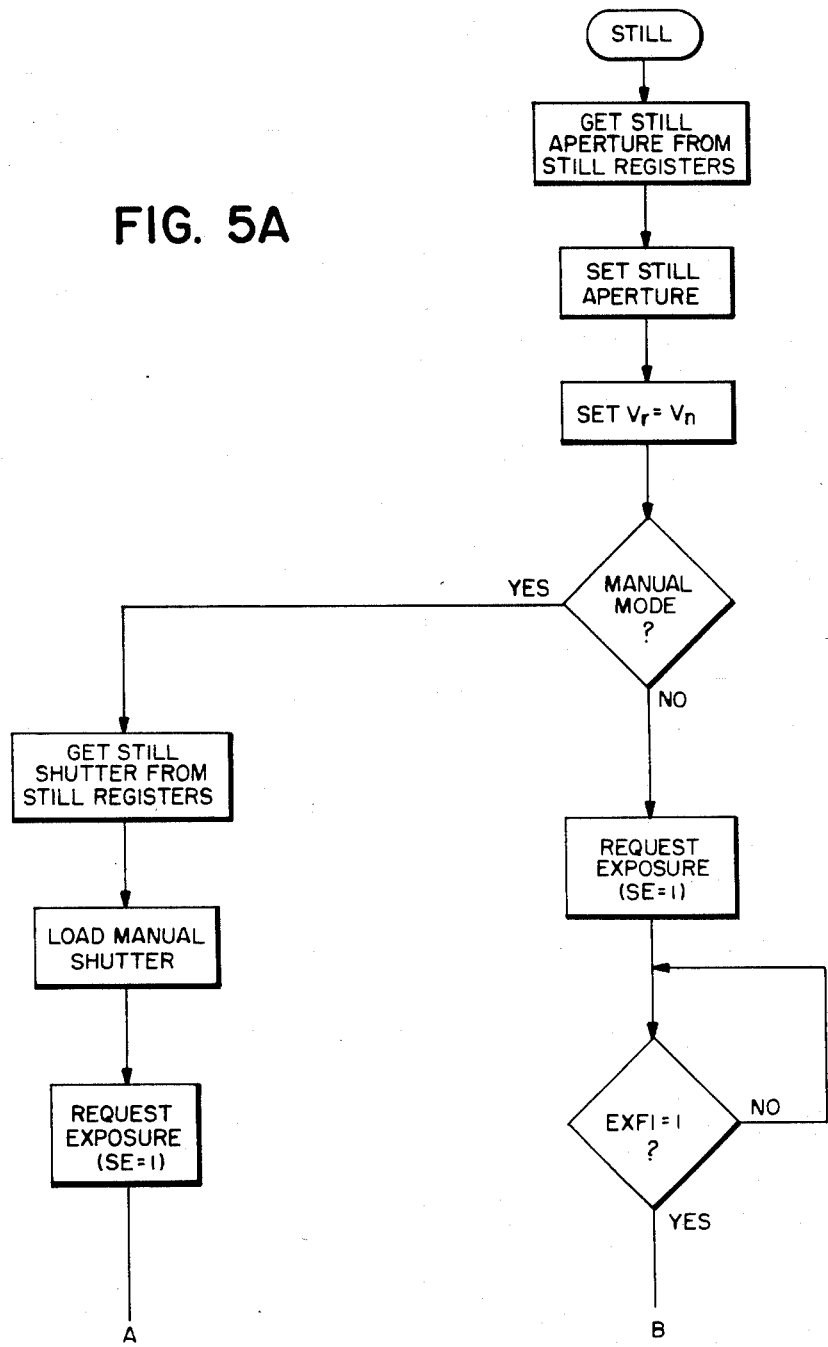
FIGS. 5 (A and B) is a flowchart of the still mode of the camera of FIG. 1.
Figure 5B:
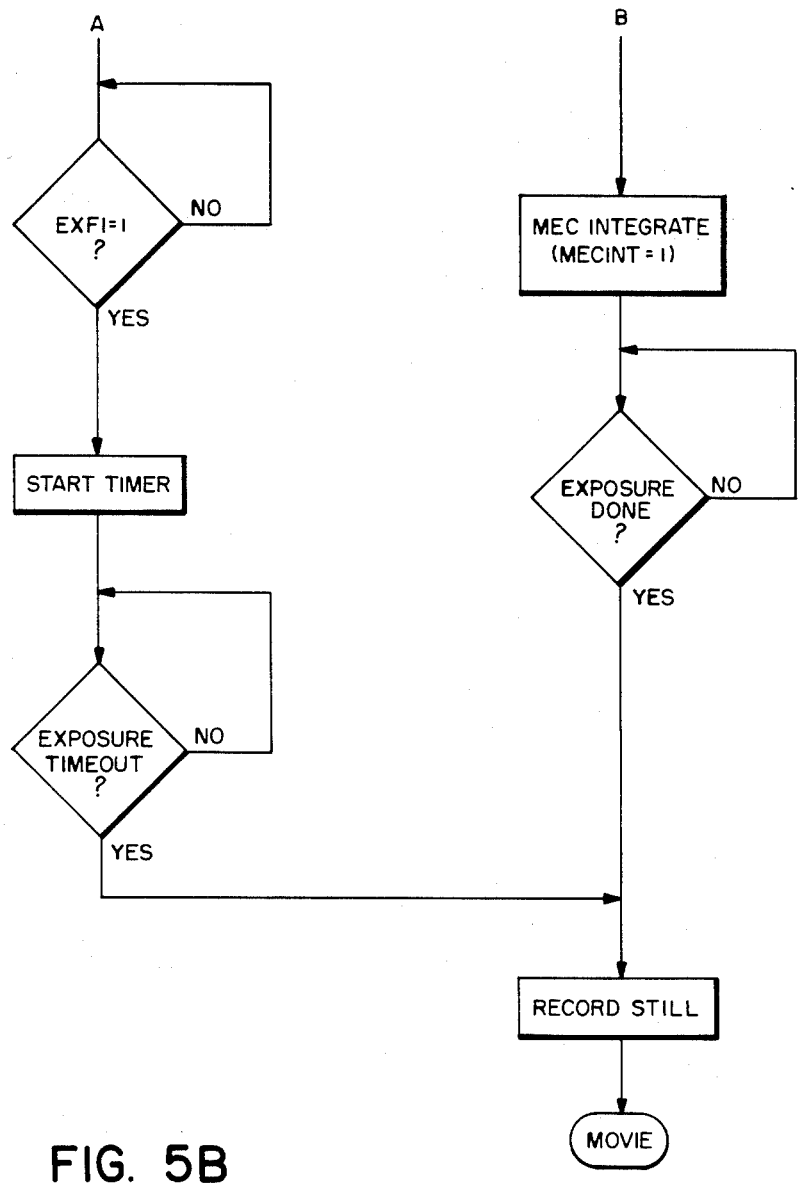

FIGS. 4 and 5 show the functional flow diagrams for the movie and still modes of operation, as well as the repetitive calculations of still exposure conditions during the movie mode. Referring first to FIG. 4A, after the shutter button 80 has been partially depressed and power has been provided to the camera, the exposure control circuit 32 is reset and the movie mode reference voltage $V_r$ is set to one-eighth of the nominal voltage $V_n$ and supplied to the comparator 66. The viewfinder 40 is unblanked and a special program delay is set. This delay establishes a maximum time for the movie exposure control integration cycle.

The circuit 32 is then reset and an integration cycle begins. When, either the delay has ended or the integration cycle is completed, a brightness value $B_v$ and an aperture value $A_v$ are calculated. The brightness value $B_v$ is a function of the existing aperture value and the time that is taken to integrate to the reference voltage $V_r$ (as shown by the counter 68). The new aperture value $A_v$ is then a function of the newly calculated brightness value $B_v$. Although these calculations may be done in a number of ways, the brightness $B_v$ is calculated in the preferred embodiment according to the following steps:

$N_v = \log_2 CNT$ (CNT = value in the counter 68);
$B_v = A_v - N_v + 10$ ($A_v$ = existing aperture);
$A_v = B_v - 1.0$ ($B_v$ = new brightness).

The aperture is now set to the new aperture value $A_v$.

The exposure bias switch 82 is checked to see if it indicates any kind of exposure override. If any exposure bias is indicated, the bias value is stored in an exposure bias register (not shown separately, but part of the microprocessor 14). The shutter button 80 is checked to see if an exposure release signal $S_2$ has been generated.

If it has, the flow of operation goes over to the still sequence in FIG. 5A. If the release signal $S_2$ has not been generated, a new still exposure value is calculated and stored (the sequence illustrated in FIGS. 4A and 4B is rapid enough so that a still exposure would be initially calculated before the shutter release signal $S_2$ is first enabled). The first step in calculating the still exposure condition is to determine the still exposure mode, which is input on a line 72 to the microprocessor 14. According to this mode, and with the shutter and aperture settings on lines 74 and 76 (if needed), the appropriate calculation is made and the result is stored in the still registers 57; then the display 78 is updated and the operational flow returns to the beginning of the movie mode.

If the exposure release signal $S_2$ has been set high, the operation exits the flow sequence in FIG. 4B and begins the sequence in FIG. 5A. The still aperture value, which has been already calculated and stored, is obtained from the still registers 57. The still aperture is then set to the stored value. The reference voltage $V_R$ is set equal to the still nominal voltage $V_n$ and provided to the comparator 66. If the exposure mode line 72 indicates that the user is in a manual mode of operation the exposure control circuit 32 is not operated. Instead, the microprocessor 14 obtains the still shutter and aperture values from the still registers 57 and loads the manually selected exposure time into an internal counter (not separately shown in FIG. 1). When the internal counter times out, the exposure is stopped (by dropping the transfer gate signal XSG low). If the exposure mode selected on the line 72 was other than manual, the exposure is commenced by setting the expose field signal EXF1 high and by enabling the exposure control circuit 32 (the signal MECINT is set high). The exposure is then completed when the comparator 66 changes state. Then, as shown by FIG. 3, the image charge is held in the vertical shift registers of the imager 12 until the next occurrence of the vertical drive interval. At that time the video signal is taken off the imager, processed and recorded on the magnetic disk 48. The sequence of operations then returns to the movie mode as illustrated by FIG. 4.

The flow diagrams shown by FIGS. 4 and 5 are represented by conventional software programmed into the microprocessor 14; the provision of such software is within the capability of an ordinarily-skilled programmer given the present disclosure and the flow diagrams of FIGS. 4 and 5.

The foregoing disclosure describes a still video camera that quickly and efficiently makes the "changeover" from the movie (viewfinder) mode to the still mode without having to delay the still exposure until a relatively lengthy exposure measurement is completed. By continuously calculating the still exposure conditions while the moving scene is observed through the viewfinder, the camera can quickly turn to recording a still rendition of the observed scene when the shutter button is pressed.

The invention has been described in detail with particular reference to a presently preferred embodiment thereof, but it will be understood that variations and modifications can be effected within the spirit and scope of the invention.

What is claimed is:

1. In a still video camera that includes an electronic viewfinder for previewing a video image of an object and an image sensor that receives image light from the object and operates thereupon either as a signal source for the viewfinder or as a signal source for a still image processed by the camera, the camera further including a photosensor for generating a signal corresponding to the brightness of the image light and diaphragm means for establishing an aperture through which the image light passes, the improvement wherein the camera comprises:

means dependent upon an output of the photosensor for concurrently determining the correct exposure conditions for both still and moving pictures produced from the same image light;

means for storing said correct exposure conditions for a still picture;

means for controlling said diaphragm means according to said correct exposure conditions for a moving picture while the viewfinder is being used for previewing the video image;

a shutter release for initiating a still exposure; and means responsive to the actuation of said shutter release for operating the image sensor as a signal source for a still image and for coincidentally retrieving said stored correct exposure conditions and controlling said diaphragm means according to said correct exposure conditions for a still picture.

2. A still video camera as claimed in claim 1, further comprising:

exposure bias means for similarly modifying the exposure conditions determined for both still and moving pictures; and means for actuating said exposure bias means during the operation of the viewfinder thereby affecting the video image previewed by the viewfinder and modifying said still exposure conditions so as to similarly affect the still picture.

3. In a still video camera that includes an electronic viewfinder for previewing a video image of an object and an image sensor that receives image light from the object and operates thereupon either as a signal source for the viewfinder or as a signal source for a still image processed by the camera, the camera further including a photosensor for generating a signal corresponding to the brightness of the image light and diaphragm means for establishing an aperture through which the image light passes, the improvement wherein the camera comprises:

means dependent upon an output of the photosensor for concurrently determining the correct exposure conditions for both still and moving pictures produced from the same image light;

exposure bias means for similarly modifying the exposure conditions determined for both still and moving pictures;

means for actuating said exposure bias means during the operation of the viewfinder thereby affecting the video image previewed by the viewfinder and modifying said still exposure conditions so as to similarly affect the still picture;

means for controlling said diaphragm means according to said modified exposure conditions for a moving picture while the viewfinder is being used for previewing the video image;

a shutter release for initiating a still exposure; and means responsive to the actuation of said shutter release for operating the image sensor as a signal source for a still image and for coincidentally controlling said diaphragm means according to said modified exposure conditions for a still picture.

4. A still video camera as claimed in claim 3 further comprising:
   means for storing said modified exposure conditions for a still picture; and
   means for retrieving said stored modified exposure conditions and providing them to said means responsive to the actuation of said shutter release.

* * * * *